(12) United States Patent
Takada et al.

(10) Patent No.: US 7,324,463 B2
(45) Date of Patent: Jan. 29, 2008

(54) COMMUNICATION CONTROL APPARATUS AND NETWORK MANAGEMENT SYSTEM USING THE SAME

(75) Inventors: Yukio Takada, Osaka (JP); Hirotaka Ino, Osaka (JP); Megumi Shimizu, Osaka (JP); Yayoi Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 542 days.

(21) Appl. No.: 11/053,026

(22) Filed: Feb. 8, 2005

(65) Prior Publication Data

US 2005/0195844 A1  Sep. 8, 2005

(30) Foreign Application Priority Data

Feb. 9, 2004  (JP) ............................ 2004-032400

(51) Int. Cl.
*H04L 12/16* (2006.01)
(52) U.S. Cl. ...................... 370/259; 455/410; 709/220
(58) Field of Classification Search ...................... None
See application file for complete search history.

(56) References Cited

U.S. PATENT DOCUMENTS

| | | | |
|---|---|---|---|
| 5,555,376 A | 9/1996 | Theimer et al. | |
| 7,263,070 B1* | 8/2007 | Delker et al. | 370/254 |
| 2002/0152285 A1 | 10/2002 | Wheeler et al. | |
| 2003/0018816 A1 | 1/2003 | Godfrey et al. | |
| 2004/0133689 A1* | 7/2004 | Vasisht | 709/228 |
| 2004/0203783 A1* | 10/2004 | Wu et al. | 455/436 |
| 2007/0053508 A1* | 3/2007 | Yasumoto | 380/28 |

FOREIGN PATENT DOCUMENTS

| | | |
|---|---|---|
| EP | 1 361 727 A | 11/2003 |
| JP | 9-128446 | 5/1997 |
| WO | WO 03/030043 A | 4/2003 |

OTHER PUBLICATIONS

European Search Report issued for European Application No. 05250747 mailed on Jun. 21, 2006.
Patent Abstract of JP9-128446, Publication date May 16, 1997, supplied from the esp@cenet Worldwide database, 1 page.

* cited by examiner

Primary Examiner—Phirin Sam
(74) Attorney, Agent, or Firm—Osha•Liang LLP

(57) ABSTRACT

A communication control apparatus that enables a personal computer usually connected to a LAN when in use to be connected temporarily to the same LAN from a different location and via a different communication device, while ensuring security without time and effort spent on configuration. A communication control apparatus connected to a LAN including a server, personal computers and communication devices (e.g., routers) that relay data between the server and the personal computers is provided with: a storage device that stores a scheduled time at which a personal computer is connected for use at another location in the same LAN, information of a communication device for the other location and configuration information of the communication device for enabling communication with the personal computer; and a timer indicating a time. The communication control apparatus compares the scheduled time and the time indicated by the timer, and performs configuration of the communication device to which the personal computer is scheduled to be connected based on the information of the communication device and the configuration information that are stored in the storage device, before the scheduled time.

6 Claims, 13 Drawing Sheets

| name code | user name | IP address | MAC address |
|---|---|---|---|
| 96000036 | John Smith | 10.*.*.* | 00********** |
| 99000111 | Robert Brown | 10.*.*.* | 00********** |
| 20000222 | Mary Jones | 10.*.*.* | 00********** |

FIG.2

| time data | name code | user name | reserved meeting room | accounting data |
|---|---|---|---|---|
| 2003.0723 16:00-19:00 | 9600036 | John Smith | meeting room C | 2000 |
| 2003.0725 10:00-19:00 | 9900111 | Robert Brown | meeting room D | 9000 |
| 2003.0728 10:00-19:00 | 2000222 | Mary Jones | meeting room D wireless LAN | 9000 |

FIG.4

| name code | user name | IP address | MAC address | WEP key | SSID | time data | reservation |
|---|---|---|---|---|---|---|---|
| 9600036 | John Smith | 10.*.*.* | 00*********** | ************ | — | 2003.0723 16:00-19:00 | meeting room C |
| 9900111 | Robert Brown | 10.*.*.* | 00*********** | ************ | — | 2003.0725 10:00-19:00 | meeting room C |
| 2000222 | Mary Jones | 10.*.*.* | 00*********** | ************ | WIRELESS | 2003.0728 10:00-19:00 | meeting room D wireless LAN |

FIG.5

COMMUNICATION CONTROL APPARATUS AND NETWORK MANAGEMENT SYSTEM USING THE SAME

BACKGROUND OF THE INVENTION

1. Field of the Invention

The present invention relates to communication control systems that enable a personal computer usually connected to a local area network (LAN) when in use to be connected temporarily to the same LAN from a different location and via a different communication device, while ensuring security without time and effort spent on configuration, and network management systems using such communication control systems.

2. Description of the Related Art

In recent years, software generally called groupware has been widely used in companies and the like. The use of groupware permits an effective schedule management of group members or reservation of shared facilities such as a meeting room.

JP H09-128446A discloses a system that enables also a reservation of equipment to be used, at the time of reserving the use of a meeting room and the like. In this system, a reservation terminal registers a use schedule of a meeting room in a main management apparatus. The use schedule is registered as a set of at least a room name, a reservation time and equipment to be used. In each meeting room, a control apparatus is provided to perform a centralized control of environment control equipment or audio-visual equipment that is provided in the meeting room. Then, room environmental control equipment (such as an air conditioner and an illumination device) is operated in such a manner that the environment of the meeting room is adequate for use at the reservation time, and devices associated with the equipment to be used are operated in a series of procedures so that the equipment to be used that has been set in the use schedule can be used at the reservation time.

In addition, it recently has been becoming common to use personal computers and projectors to make presentations at conferences or business negotiations. In this case, when someone makes a presentation at the company he or she works at, the presentation and its preparation often are efficient if the presenter can bring, into the meeting room, a portable (notebook) personal computer that he or she usually uses and can access the company server via an in-house LAN. Therefore, a LAN cable for accessing the in-house LAN may be laid also in the meeting room, and a unique IP (Internet Protocol) address and the like may be provided for the meeting room. Furthermore, wireless LANs have been coming into widespread use in recent years, and it has been becoming possible to set up an access point of a wireless LAN in the meeting room or its vicinity, and to access the company server via this access point.

However, since people who are not with the company may enter the meeting room for meetings or negotiations, security considerations are required for connections to the in-house LAN from the meeting room in order to prevent unauthorized access or eavesdropping. In particular, special considerations are required in the case of using a wireless LAN because of its lower security as compared with a wired LAN.

Therefore, in the case of a wired LAN, the address management of the meeting room generally has been performed by one of the following three methods: (1) Only the users of the meeting room are notified of a unique address configured for the meeting room, and the system manager changes the unique address of the meeting room each time the meeting room is used or at an appropriate frequency; (2) A personal computer is provided with an IP address corresponding to a MAC (Media Access Control) address at the time of connection by using a DHCP (Dynamic Host Configuration Protocol) server or the like; and (3) A personal computer that is usually used at the office is used also in the meeting room and the like by using a dynamic V-LAN. However, in the case of the method (1), the configuration change needs to be performed manually, causing a heavy burden to the user during the configuration change or to the system manager. In the case of the method (2), it is necessary to provide a DHCP server, resulting in many operation man-hours for, for example, the MAC address management for terminal clients. In addition, unauthorized access becomes possible if the MAC address is forged. Furthermore, in the case of the method (3), the configuration change for the personal computer and the like does not need to be performed, but special network equipment or an authentication server will be required, leading to a cost increase.

In the case of a wireless LAN, there is the possibility that the encryption key may be decrypted if a WEP (Wired Equivalent Privacy) key is fixed, so that it is necessary to change the WEP key at an appropriate frequency. According to the literature, when a large volume of data is sent/received using a 128-bit WEP key under the 802.11b standard, it is possible to determine the WEP key based on the data with about 8 hours of collected data. Furthermore, the time required for determining a WEP key has become even shorter, owing to a recent increase in the speed of wireless LANs.

In response to this, WPA (Wi-Fi protected access) recently has been standardized as a result of improvements in the security of wireless LANs. This system has been improved in the vulnerability to eavesdropping and unauthorized access, which are weaknesses of WEP. Particularly, in terms of protection against eavesdropping, it is not possible to decrypt data easily by data accumulation. Therefore, the system is relatively safe even when the same shared key is used for a long period of time. If the key is constantly fixed, however, it may lead to a danger in case the shared key is disclosed, so that it is preferable to change the key periodically. However, it is burdensome for the system manager to perform this operation manually. In addition, although a system for changing a WEP key dynamically by performing authentication by an ID and a password with a RADIUS (Remote Authentication Dial-In User Service) server also has become available recently, this has the problem of requiring many man-hours to operate the server.

SUMMARY OF THE INVENTION

Therefore, with the foregoing in mind, one or more embodiments of the present invention provide a network management system that enables a personal computer usually connected to a LAN when in use to be connected temporarily to the same LAN from a different location and via a different communication device, while ensuring security without time and effort spent on configuration.

In one or more embodiments, a communication control apparatus according to the present invention is a communication control apparatus that is connected to a local area network including a server device, one or more client devices and one or more communication devices that relay data between the server device and the client devices, the communication control apparatus including: a storage portion that stores a scheduled time at which a client device connected to the local area network is connected for use at another location in the same local area network, information of a communication device for the other location and configuration information of the communication device for enabling communication with the client device; and a timer that indicates a time, wherein the communication control apparatus compares the scheduled time and the time indicated by the timer, and performs configuration of the communication device to which the client device is scheduled to be connected based on the information of the communication device and the configuration information that are stored in the storage section, before the scheduled time.

Furthermore, in one or more embodiments, a network management system according to the present invention is a network management system for enabling, on a local area network including a server device, one or more client devices and one or more communication devices that relay data between the server device and the client devices, a client device connected to the local area network to be connected for use at another location in the same local area network, the system including: a communication control apparatus that performs configuration of the communication device and includes a storage portion and a timer; a schedule management portion for entering and storing, from a client device connected to the local area network, a scheduled time at which the client device is connected for use at another location in the same local area network and information relating to the other location; and a configuration information storage portion that stores configuration information of a communication device for enabling communication with client devices connected to the local area network, wherein the communication control apparatus references the schedule management portion and stores, in the storage portion, the scheduled time stored in the schedule management portion and information of a communication device for a location to which the client device is scheduled to be connected, and references the configuration information storage portion and stores, in the storage portion, the configuration information of the communication device for enabling communication with the client device, and compares the scheduled time and the time indicated by the timer, and performs configuration of the communication device to which the client device is scheduled to be connected based on the information of the communication device and the configuration information that are stored in the storage section, before the scheduled time.

According to the present invention, a personal computer usually connected to a LAN when in use can be connected temporarily for use to the same LAN from a different location and via a different communication device, while ensuring security without time and effort spent on configuration.

BRIEF DESCRIPTION OF THE DRAWINGS

FIG. 2 is a diagram illustrating an example of data stored in a database server in an in-house network system according to one embodiment of the present invention.

FIG. 4 is a diagram illustrating an example of data stored in a collaboration server in an in-house network system according to one embodiment of the present invention.

FIG. 5 is a diagram illustrating an example of data stored in a communication control apparatus in an in-house network system according to one embodiment of the present invention.

DETAILED DESCRIPTION OF THE INVENTION

Figure 1:
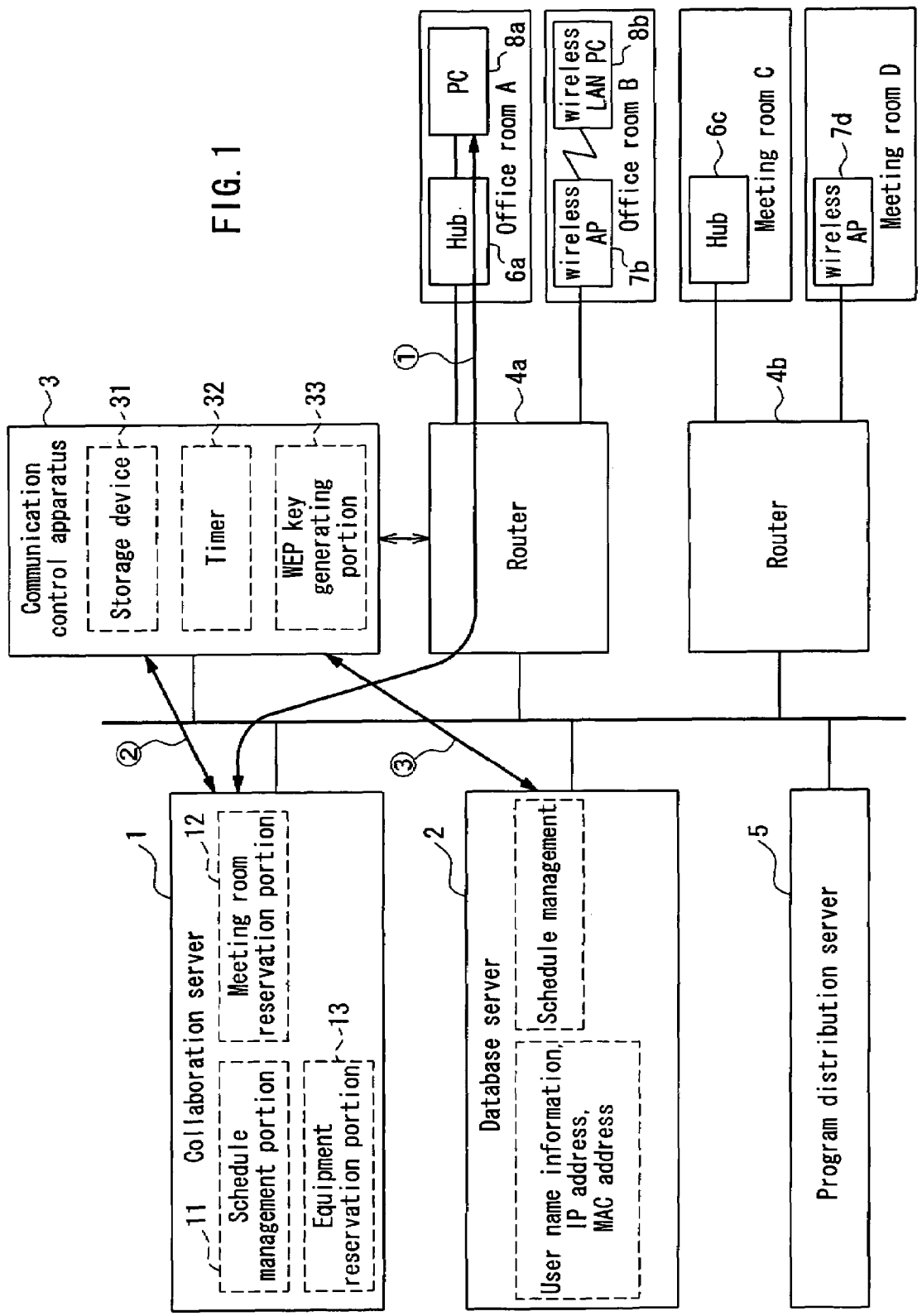
FIG. 1 is a block diagram showing the schematic configuration of an in-house network system according to one embodiment of the present invention, showing a configuration when reserving a meeting room.

A communication control apparatus according to the present invention is, as described above, a communication control apparatus that is connected to a local area network including a server device, one or more client devices and one or more communication devices that relay data between the server device and the client devices, the communication control apparatus including: a storage portion that stores a scheduled time at which a client device connected to the local area network is connected for use at another location in the same local area network, information of a communication device for the other location and configuration information of the communication device for enabling communication with the client device; and a timer that indicates a time, wherein the communication control apparatus compares the scheduled time and the time indicated by the timer, and performs configuration of the communication device to which the client device is scheduled to be connected based on the information of the communication device and the configuration information that are stored in the storage section, before the scheduled time.

In this configuration, "another location in the same local area network" described above may be, for example, another router in the local area network, and the configuration information may include, for example, the IP (Internet Protocol) address and the MAC (Media Access Control) address of the client device. That is, when a client device is used at a location (e.g., a meeting room) that is different from where the client device is usually used, the communication control apparatus of the present invention sets the IP address and the MAC address of the client device, for example, for a router connected in the meeting room. This makes it possible to establish a connection to the local area network at a location that is different from the usual location with the client device that is usually used. Additionally, the communication control apparatus is configured only for a client device that is scheduled to be used, before the scheduled time, thus providing an advantage that the level of security is improved as compared with the conventional method of providing the meeting room with a constantly fixed IP address and the like. Furthermore, since the communication control apparatus performs configuration of the communication device, it is possible to save the time and effort of the system manager to provide an IP address and the like in each case, and thereby to reduce the management burden.

In the case where the local area network further includes a wireless LAN access point as the communication device in addition to the above-described configuration, "another location in the same local area network" described above may be, for example, another wireless LAN access point in the local area network, and it is preferable that the communication control apparatus further includes a WEP key generating portion that generates a WEP (Wired Equivalent Privacy) key that is distributed to each client device, and that the configuration information further includes an SSID (Service Set ID) of the client device and a newly generated WEP key.

With this configuration, the communication control apparatus sets the SSID and a newly generated WEP key for a wireless access point to which the client device is scheduled to be connected, so that the client device usually used as a wireless LAN client can be used at another wireless LAN access point. Additionally, the communication control apparatus generates a WEP key and this WEP key is used when the client device is connected to another wireless LAN access point, thus increasing the level of security. Furthermore, since the communication control apparatus generates a WEP key and performs configuration of the communication device, it is possible to reduce the management burden of the system manager.

A network management system according to the present invention is, as described above, a network management system for enabling, on a local area network including a server device, one or more client devices and one or more communication devices that relay data between the server device and the client devices, a client device connected to the local area network to be connected for use at another location in the same local area network, the system including: a communication control apparatus that performs configuration of the communication device and includes a storage portion and a timer; a schedule management portion for entering and storing, from a client device connected to the local area network, a scheduled time at which the client device is connected for use at another location in the same local area network and information relating to the other location; and a configuration information storage portion that stores configuration information of a communication device for enabling communication with client devices connected to the local area network, wherein the communication control apparatus references the schedule management portion and stores, in the storage portion, the scheduled time stored in the schedule management portion and information of a communication device for a location to which the client device is scheduled to be connected, and references the configuration information storage portion and stores, in the storage portion, the configuration information of the communication device for enabling communication with the client device, and compares the scheduled time and the time indicated by the timer, and performs configuration of the communication device to which the client device is scheduled to be connected based on the information of the communication device and the configuration information that are stored in the storage section, before the scheduled time.

In this configuration, "another location in the same local area network" described above may be, for example, another router in the local area network, and the configuration information may include, for example, the IP address and the MAC address of the client device. That is, when a client device is used at a location (e.g., a meeting room) that is different from where the client device is usually used, the communication control apparatus in the network management system of the present invention sets the IP address and the MAC address of the client device, for example, for a router connected in the meeting room. This makes it possible to establish a connection to the local area network at a location that is different from the usual location with the client device that is usually used. Additionally, the communication control apparatus is configured only for a client device that is scheduled to be used, before the scheduled time, thus providing an advantage that the level of security is improved as compared with the conventional method of providing the meeting room with a constantly fixed IP address and the like. Furthermore, since the communication control apparatus performs configuration of the communication device, it is possible to save the time and effort of the system manager to provide an IP address in each case, and thereby to reduce the management burden.

In the case where the local area network further includes a wireless LAN access point as the communication device in addition to the above-described configuration, "another location in the same local area network" described above may be, for example, another wireless LAN access point in the local area network, and it is also preferable that the communication control apparatus further includes a WEP key generating portion that generates a WEP key that is distributed to each client device, and that the configuration information further includes an SSID of the client device and a newly generated WEP key.

With this configuration, the communication control apparatus sets the SSID and a newly generated WEP key for a wireless access point to which the client device is scheduled to be connected, so that the client device usually used as a wireless LAN client can be used at another wireless LAN access point. Additionally, the communication control apparatus generates a WEP key and this WEP key is used when the client device is connected to another wireless LAN access point, thus increasing the level of security. Furthermore, since the communication control apparatus generates a WEP key and performs configuration of the communication device, it is possible to reduce the management burden of the system manager.

Hereinafter, embodiments of the present invention are described in detail by way of preferred embodiments thereof with reference to accompanying drawings.

First Embodiment

In a first embodiment, an in-house (company) network system is described as one embodiment of a network management system according to the present invention. However, the invention is not limited to this embodiment, and also can be applied to any local area network other than company networks.

FIG. 1 is a block diagram showing the schematic configuration of an in-house network system according to this embodiment. As shown in FIG. 1, the in-house network system of this embodiment has a configuration in which a collaboration server 1, a database server 2, a communication control apparatus 3, routers 4a, 4b, a program distribution server 5, etc. are connected to each other via communication cables. Communications between personal computers (hereinafter, abbreviated as "PCs") 8a, 8b serving as client devices, and the collaboration server 1, the database server 2, the program distribution server 5 and other servers not shown in FIG. 1 are relayed by communication devices such as the routers 4a, 4b, hubs 6a, 6c and wireless LAN access points (hereinafter, abbreviated as "wireless APs") 7b, 7d.

The hub 6a provided in an office room A and the wireless AP 7b provided in an office room B are connected to the router 4a. The hub 6c provided in a meeting room C and the wireless AP 7d provided in a meeting room D are connected to the router 4b. The PC 8a in the office room A is connected to the hub 6a with a LAN cable. On the other hand, the PC 8b in the office room B is connectable as a wireless LAN client to the wireless AP 7b. For the sake of simplicity, a single hub or a single wireless AP is provided in each of the office rooms and the meeting rooms shown in FIG. 1, but any number of these may be provided. The hub and the wireless AP also may be present together in the same office room. Further, although a single PC is connected to the hub 6a in the configuration shown in FIG. 1, any number of PCs can be connected in accordance with the number of ports in the hub. A larger number of PCs can be connected by cascade-connecting the hub.

To provide a variety of functionality such as schedule management functionality, meeting room reservation functionality and equipment reservation functionality, the collaboration server 1 includes, for example, a schedule management portion 11, a meeting room reservation portion 12 and an equipment reservation portion 13 (others are not shown). This functionality can be used by accessing the collaboration server 1 from a client (e.g., the PC 8a).

The database server 2 stores name information of users of this in-house network system and information relating to the IP address and the MAC address of a PC used by each of the users. The IP address and the MAC address also can be detected automatically at the time of connecting the PC, or can be produced automatically by using a name code as an ID when accessing the collaboration server 1. The database server 2 may be operated in cooperation with the collaboration server 1 to store also data relating to a schedule managed by the collaboration server 1. FIG. 2 shows an example of data stored in the database server 2. In the example show in FIG. 2, a 7-digit name code assigned uniquely to each user and the user name are stored as name information. Additionally, the IP address and the MAC address of a PC used by each user are registered.

The communication control apparatus 3 includes a storage device 31, a timer 32 and a WEP key generating portion 33, and is operated together with the collaboration server 1 and the database server 2 to enable the PCs to be used in the meeting rooms.

Here, the procedure and the operation of various portions that are performed when reserving a meeting room in the in-house network system of this embodiment having the above-described configuration are described. First, a case is described where the use of a wired LAN PC in a meeting room is reserved, with reference to FIGS. 3 to 7.

Figure 3:
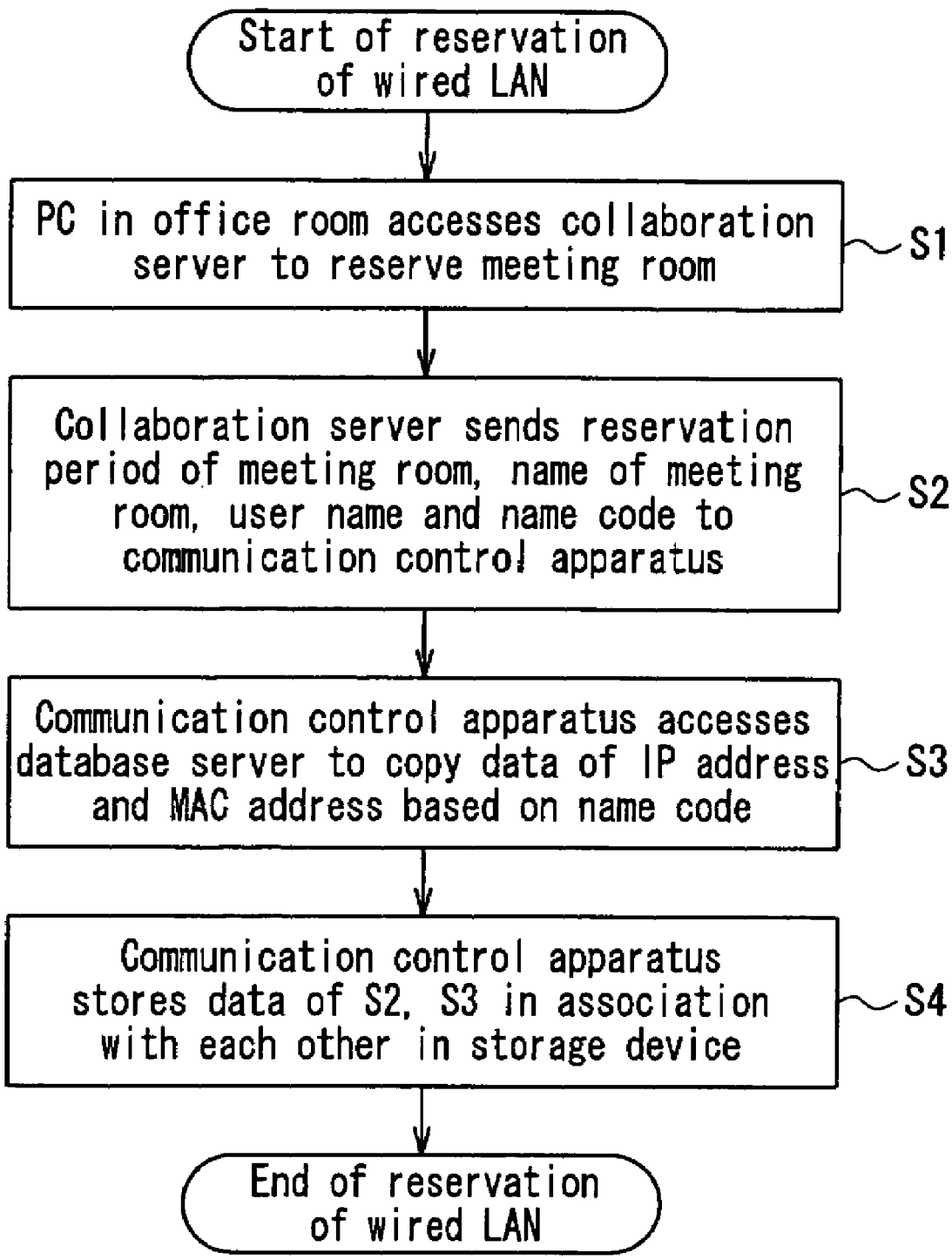
FIG. 3 is a flowchart showing the procedure performed when reserving the use of a wired LAN personal computer in a meeting room, in an in-house network system according to one embodiment of the present invention.

FIG. 3 is a flowchart showing the procedure performed when reserving a meeting room in the in-house network system. FIG. 4 is a diagram illustrating an example of data stored in the collaboration server 1, and FIG. 5 is a diagram illustrating an example of data stored in the communication control apparatus 3. First, the user accesses the collaboration server 1 from a PC in an office room to reserve a meeting room (step S1 in FIG. 3). At this time, the user enters the reservation period of the meeting room, the name of the meeting room, the user name and the name code. The entered information is sent to the meeting room reservation portion 12. Alternatively, the user name and the name code may be obtained automatically from log-in information to the collaboration server 1. It should be noted that each of the bold arrows indicated by circled numerals in FIG. 1 show how data, control commands and the like are exchanged in each step. For example, the circled numeral 1 in FIG. 1 corresponds to step S1. Accordingly, reservation information as shown in FIG. 4 is stored in the collaboration server 1. This reservation information may include given data such as accounting information, in addition to time data representing the reservation period of a meeting room, the name code and name of a reserving person (a user of the meeting room) and the name of the reserved meeting room.

Next, of the reservation information obtained in step S1, the meeting room reservation portion 12 of the collaboration server 1 sends the reservation period of the meeting room, the name of the meeting room, the user name and the name code to the communication control apparatus 3 (step S2). The communication control apparatus 3 stores, in the storage device 31, these data sent from the collaboration server 1.

Next, the communication control apparatus 3 accesses the database server 2 to obtain data of the IP address and the MAC address of the user's PC, based on the name code sent from the collaboration server 1 in step S2 (step S3). Then, the communication control apparatus 3 stores, in the storage device 31, the data obtained in step S2 and step S3 in association with each other (step S4). Accordingly, data as shown in FIG. 5 are stored in the storage device 31. Although the name of the reserved meeting room is stored in the storage device 31 in FIG. 5, the collaboration server 1 may convert the name of the reserved meeting room into information specifying a router set up for the meeting room, and then may send the information to the communication control apparatus 3.

The process performed when reserving a meeting room is completed by steps S1 to S4 described above.

Figure 6:
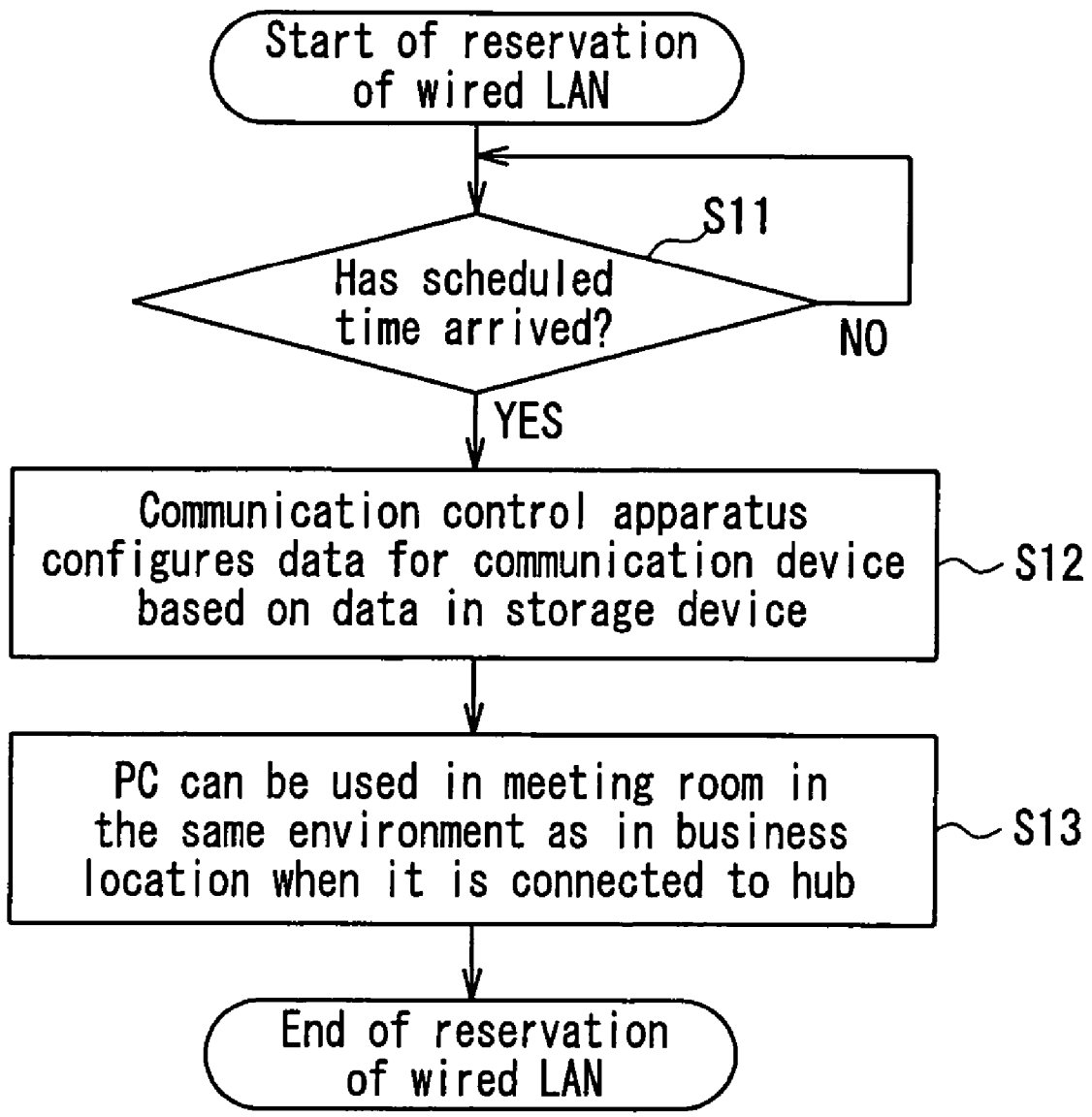
FIG. 6 is a flowchart showing the procedure performed when using a wired LAN personal computer in a meeting room, in an in-house network system according to one embodiment of the present invention.

In the following, the process performed when using a meeting room is described with reference to FIGS. 6 and 7.

When the communication control apparatus 3 detects that the scheduled start time of use of the meeting room is approaching (YES in step S11) by comparing the time of the timer 32 and the time data (the reservation period of the meeting room) stored in the storage device 31, it performs the necessary configuration of the router connected to the meeting room based on the IP address and the MAC address stored in the storage device 31 (step S12). For example, in the data example shown in FIG. 5, the communication control apparatus 3 sets the IP address and the MAC address of the PC of John Smith for the router 4*b* such that the PC of John Smith can be used from 16:00 on Jul. 23, 2003 in the meeting room C.

Figure 7:
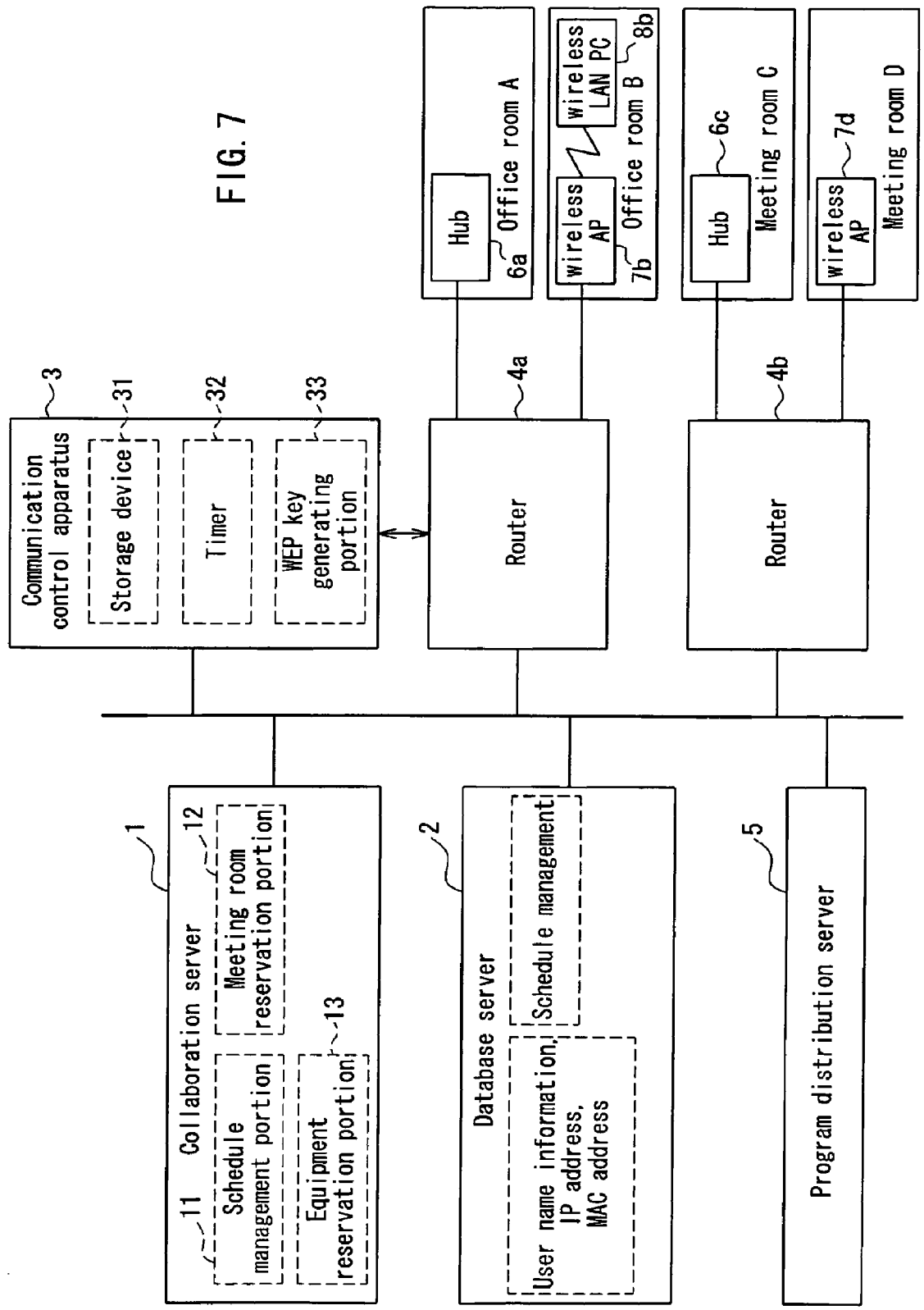
FIG. 7 is a block diagram showing the schematic configuration of an in-house network system according to one embodiment of the present invention, showing an exemplary configuration when using a meeting room.

Thus, as shown in FIG. 7, after 16:00 on Jul. 23, 2003, when John Smith brings his PC 8*a* that he usually uses in the office room A into the meeting room C and connects it to the hub 6*c*, the router 4*b* recognizes the PC 8*a* properly, allowing him to establish communications. Accordingly, John Smith can access various servers and the like on the in-house LAN in the meeting room C, using the PC 8*a*.

In order to prevent unauthorized access, it is preferable that the communication control apparatus 3 deletes the data that have been configured as described above for the router, after the end of the reservation period of the meeting room, or after the conclusion of the meeting even within the reservation period.

The procedure and the operation of using a wired LAN PC in a meeting room have been described above. In the following, a case is described where a PC having wireless LAN client functionality is used in a meeting room having a wireless AP, with reference mainly to the flowchart of FIG. 8.

Figure 8:
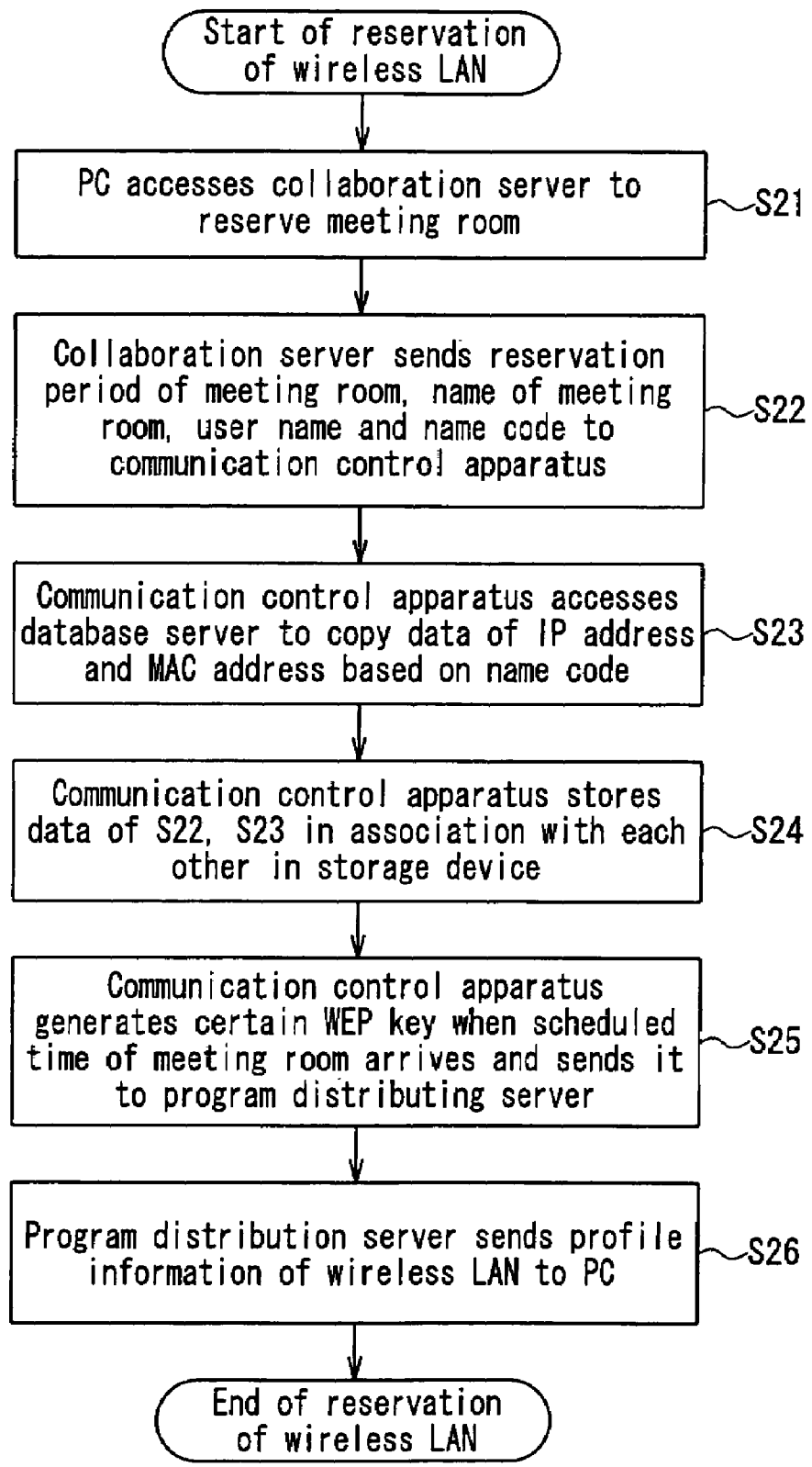
FIG. 8 is a flowchart showing the procedure performed when reserving the use of a wireless LAN personal computer in a meeting room, in an in-house network system according to one embodiment of the present invention.

First, the user accesses the collaboration server 1 from a PC in an office room to reserve a meeting room (step S21 in FIG. 8). At this time, the user enters a request for using a wireless LAN PC, in addition to the reservation period of the meeting room, the name of the meeting room, the user name and the name code. Alternatively, the user name and the name code may be obtained automatically from log-in information to the collaboration server 1. Accordingly, reservation information as shown at the bottom row in FIG. 4 is stored in the collaboration server 1.

Next, of the reservation information obtained in step S21, the collaboration server 1 sends the reservation period of the meeting room, the name of the meeting room, the user name and the name code to the communication control apparatus 3 (step S22). The communication control apparatus 3 stores, in the storage device 31, these data sent from the collaboration server 1.

Next, the communication control apparatus 3 accesses the database server 2 to obtain data of the IP address and the MAC address of the user's PC, based on the name code sent from the collaboration server 1 in step S22 (step S23). Then, the communication control apparatus 3 stores, in the storage device 31, the data obtained in step S22 and step S23 in association with each other (step S24).

Next, the communication control apparatus 3 generates a WEP key with the WEP key generating portion 33, and stores the WEP key in the storage device 31 (step S25). Accordingly, data as shown at the bottom row in FIG. 5 relating to the user who has reserved the use of a wireless LAN PC in a meeting room are stored in the storage device 31. Although the SSID of the wireless AP in a meeting room may be changed or randomized, in such a case it may be unclear what SSID is used in the meeting room, resulting in an inconvenience for a user. Therefore, in this embodiment, a unique SSID is used for a wireless AP in the meeting room. Additionally, although the number of bits of the WEP key may be set freely, the bit number preferably is as large as possible so as to improve the level of security.

It should be noted that the above-described embodiment merely is an example, and a WEP key and an SSID may be changed freely in order to improve security, which then may be sent to the PC of the user as a profile. Further, setting may be made so that the SSID becomes invisible to general users (so-called the stealth setting). Moreover, in order to improve the convenience, the same SSID as that the user usually uses in the office room may be set as the SSID for a wireless AP in the meeting room.

If consecutive reservations are made by a plurality of users for the use of the wireless LAN in the same meeting room, or if reservations are made by a plurality of users for the use of the wireless LAN in adjacent meeting rooms and the like, the WEP key generating portion 33 assigns the same WEP key to these users when generating a WEP key in step S25. The reason is as follows. The wireless AP often covers a plurality of meeting rooms, rather than a single meeting room. If a unique WEP key is assigned to each user for each reservation, there is the possibility that the WEP key is changed even though another user is using the wireless AP.

Based on data of the WEP key sent from the communication control apparatus 3, the program distribution server 5 sends profile information of the wireless LAN to the PC of the user who reserved the use of the wireless LAN PC in the meeting room (to the PC 8*b*, in this example) (step S26).

The process performed when reserving a meeting room is completed by steps S21 to S26 described above.

Figure 9:
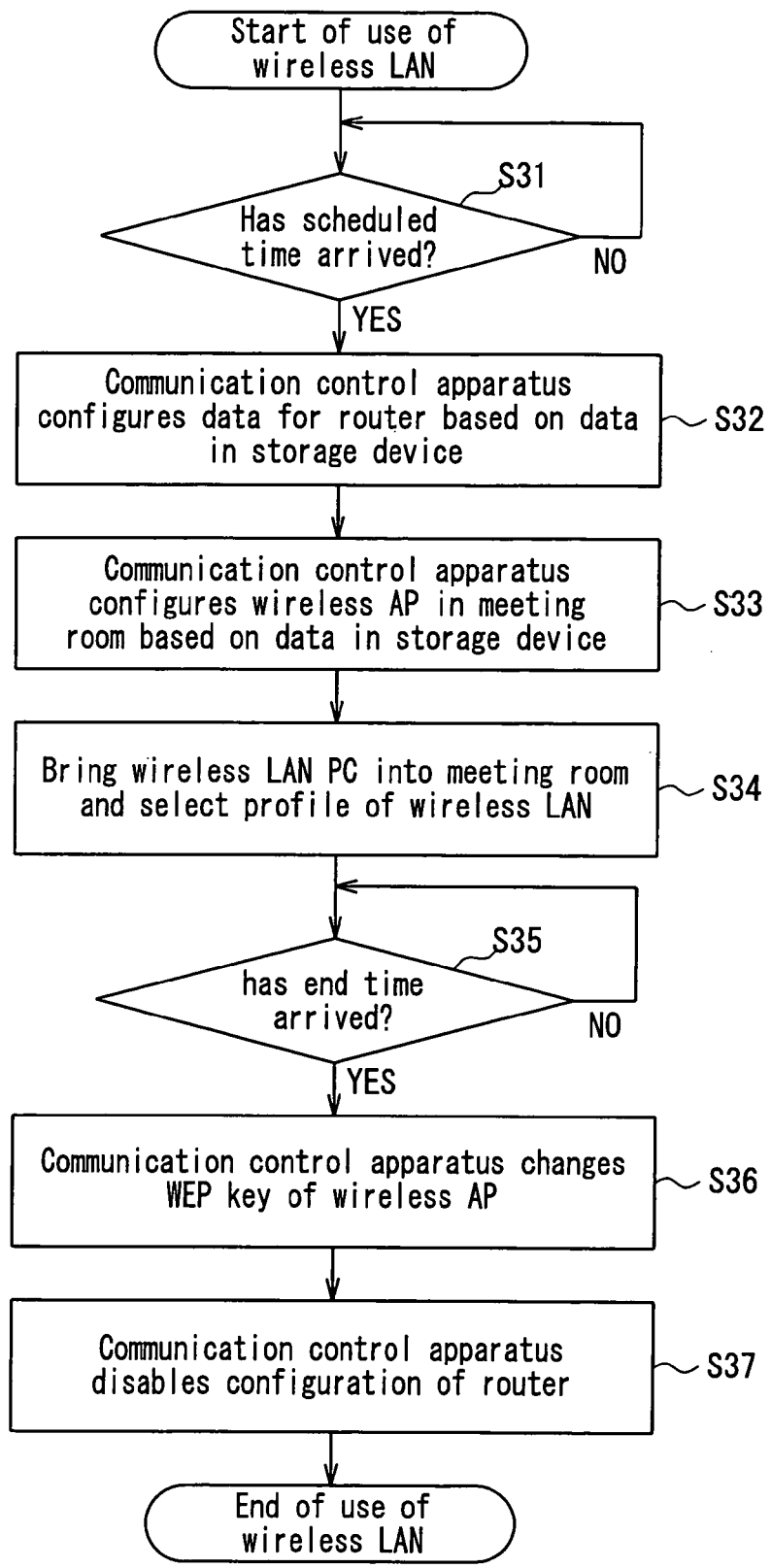
FIG. 9 is a flowchart showing the procedure performed when using a wireless LAN personal computer in a meeting room, in an in-house network system according to one embodiment of the present invention.

In the following, the process performed when using a meeting room is described with reference to FIGS. 9 and 10.

When the communication control apparatus 3 detects that a start time of use of the meeting room is approaching (YES in step S31 in FIG. 9) by comparing the time of the timer 32 and the time data (the reservation period of the meeting room) stored in the storage device 31, it configures data for the router 4*b* based on the IP address and the MAC address stored in the storage device 31 (step S32). For example, in the data example shown in FIG. 5, the communication control apparatus 3 sets the IP address and the MAC address of the PC of Mary Jones for the router 4*b* such that the PC of Mary Jones can be used after 10:00 on Jul. 28, 2003 in the meeting room D. Furthermore, the communication control apparatus 3 configures the wireless AP 7*d* of the meeting room D based on the SSID and the WEP key stored in the storage device 31 (step S33).

Figure 10:
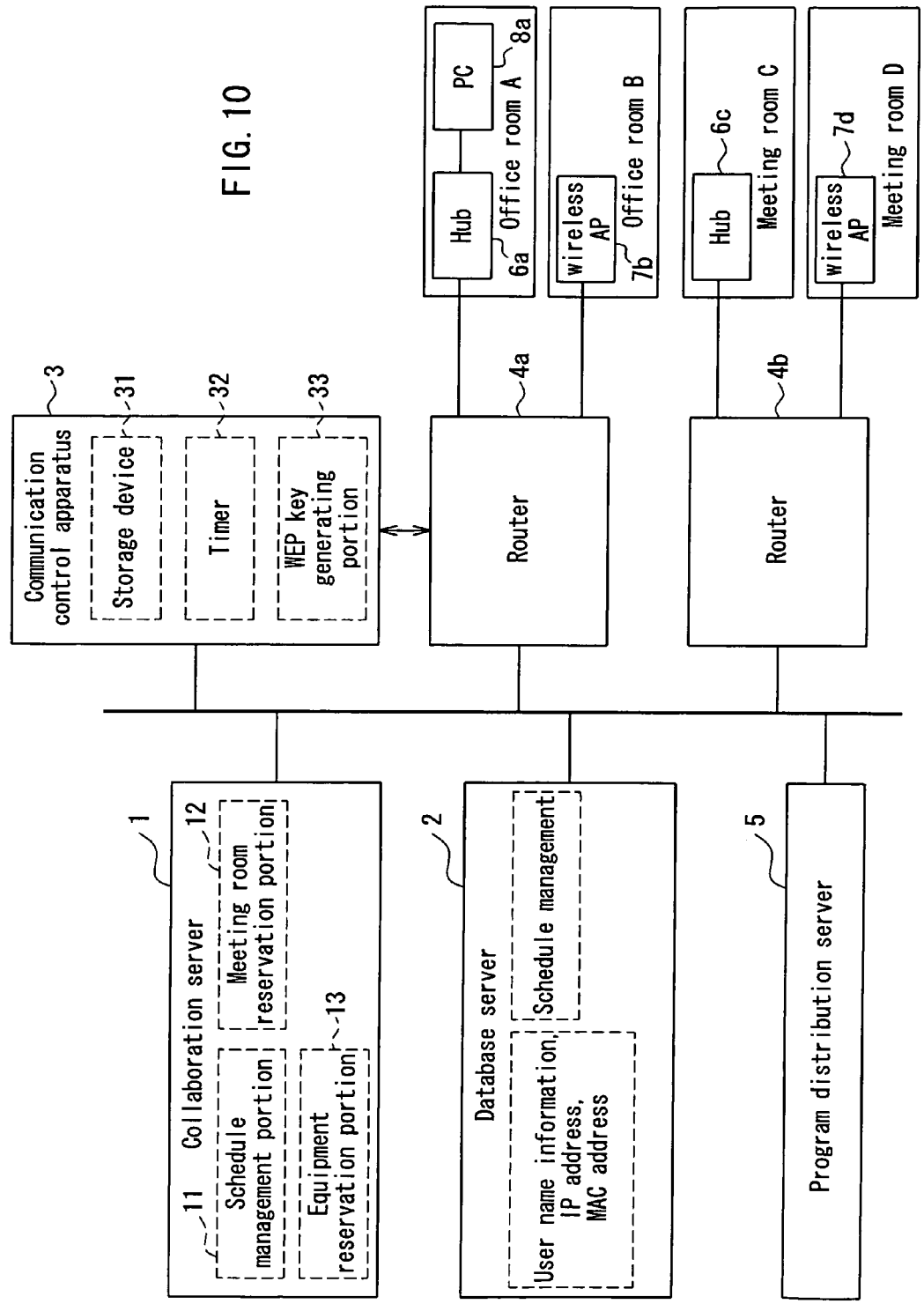
FIG. 10 is a block diagram showing the schematic configuration of an in-house network system according to one embodiment of the present invention, showing an exemplary configuration when using a meeting room.

Thus, as shown in FIG. 10, after 10:00 on Jul. 28, 2003, Mary Jones can access various servers and the like on the in-house LAN via the wireless AP 7*d* by bringing her PC 8*b* that she usually uses in the office room B into the meeting room D and selecting the profile of the wireless LAN of the PC 8*b* (step S34).

In order to prevent unauthorized access, it is preferable that the communication control apparatus 3 deletes the data that have been configured as above for the router 4*b* and the wireless AP 7*d*, after the end of the reservation period of the meeting room D, or after the conclusion of the meeting even within the reservation period.

The communication control apparatus 3 compares the timer 32 and the end time of use of the meeting room D represented by the time data stored in the storage device 31 (step S35). Then, when the communication control apparatus 3 detects that the time of the timer 32 has passed the end time of use of the meeting room D (Yes in step S35), it assigns a new WEP key (e.g., a random value) to the wireless AP 7*d* in the meeting room D (step S36), and to disable the MAC filtering on the router 4*b* (step S37).

Although it is preferable that the power of the wireless AP is turned off in an unused meeting room, security can be ensured for an unused meeting room in this example even when the power of the AP is turned on, by changing the WEP key and disabling the MAC filtering.

In addition, it is believed that a third party attempting unauthorized access can encrypt a WEP key in several hours. Therefore, as described above, in the case of using a WEP key, it is preferable to configure the communication device such that access from a meeting room to the servers can be made only when the meeting room is used by a legitimate user who reserved the meeting room, in view of enhancing security. On the other hand, in the case of using WPA or a wireless LAN device in compliance with the 802.11i standard, it is not necessary to perform the configuration change for the communication device each time the user uses the meeting room. No particular security problem will occur if the configuration change is performed at night when the meeting room is not in use, for example, once a day.

As described above, with this embodiment, a PC usually connected to a LAN when in use can be connected temporarily to the same LAN via a hub or wireless AP provided at a different location, while ensuring security without time and effort spent on configuration.

It should be noted that the above-described embodiment merely is an example, and various modifications can be made within the technical scope of the invention. For example, although three types of servers, namely, a collaboration server, a database server and a program distribution server are provided in this embodiment, the present invention also can be practiced by using a single server integrating the functionality of these servers. Furthermore, although a router for the office room and a router for the meeting room are provided separately in this embodiment, the number of routers and their connection relationship can be set freely without limitation to this.

Figure 11:
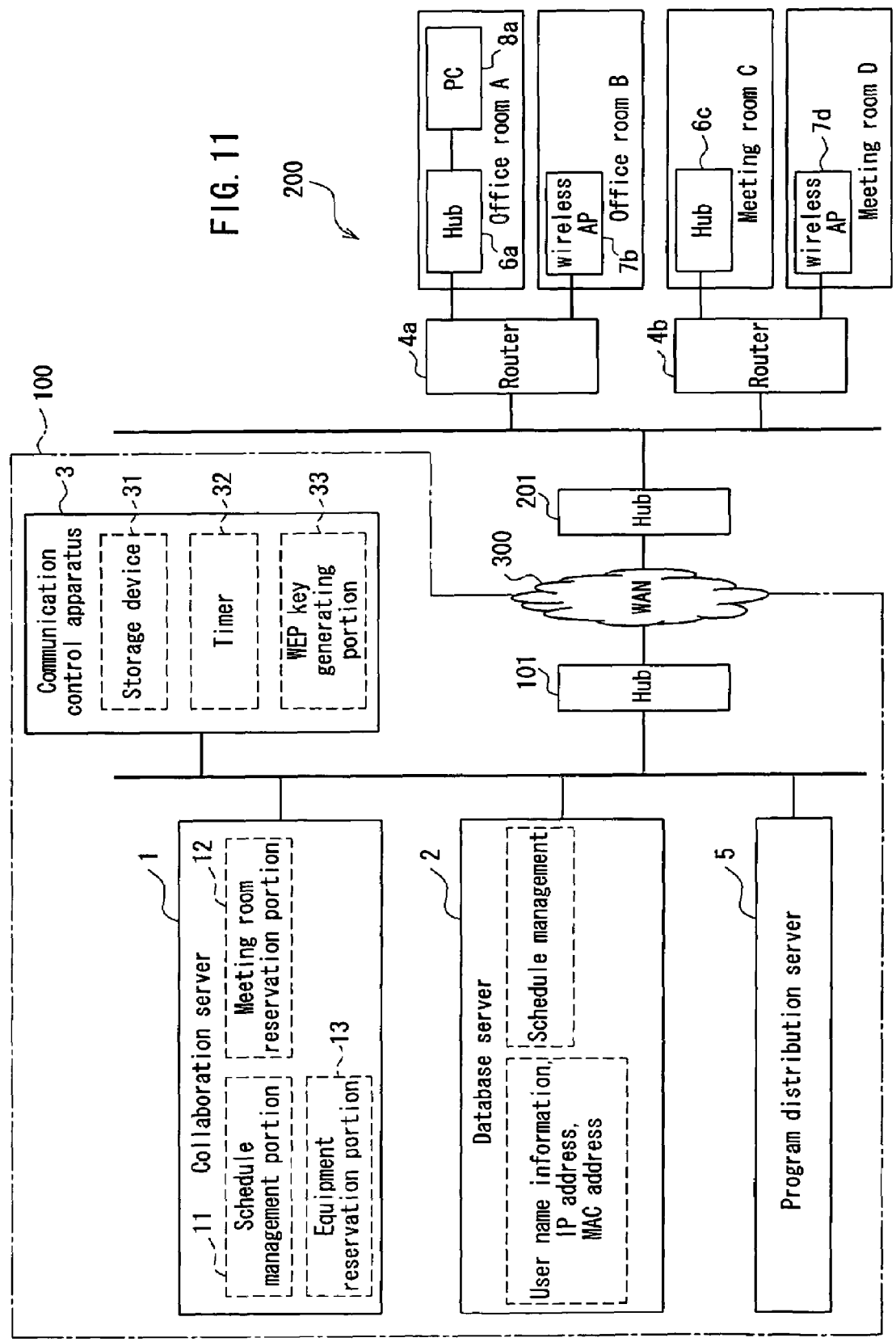
FIG. 11 is a block diagram showing the schematic configuration of a network system according to a second embodiment of the present invention.

The above-described description of this embodiment has shown a network management system constructed on a LAN as an example. However, the above-described network management method can be applied to a system in which a plurality of LANs 100, 200 are connected via a layer 2 (L2) WAN 300, as shown in FIG. 11. That is, it is possible, for example, to bring a PC usually connected to the LAN 100 when in-use, into the office rooms A, B or the meeting rooms C, D that are on the LAN 200 side. Additionally, in the configuration shown in FIG. 11, the LANs 100, 200 include, respectively, hubs 101, 201 to establish connections to other LANs via the WAN 300.

Second Embodiment

In the following, a network management system according to a second embodiment of the present invention is described. In this embodiment, LANs 100, 200 provided, for example, at the business locations of a company having a plurality of business locations are connected to each other via a layer 3 (L3) WAN 400. In the network management system according to this embodiment, a user who usually uses a PC on the LAN 100 can bring the user's PC for use into an office room or meeting room on the LAN 200, as will be described below.

In the system of this embodiment, the user cannot use the IP address used on the LAN 100 with the LAN 200. Therefore, the user who usually uses the PC on the LAN 100 has to obtain an IP address that can be used on the LAN 200 if the user wishes to use the PC on the LAN 200.

Figure 12:
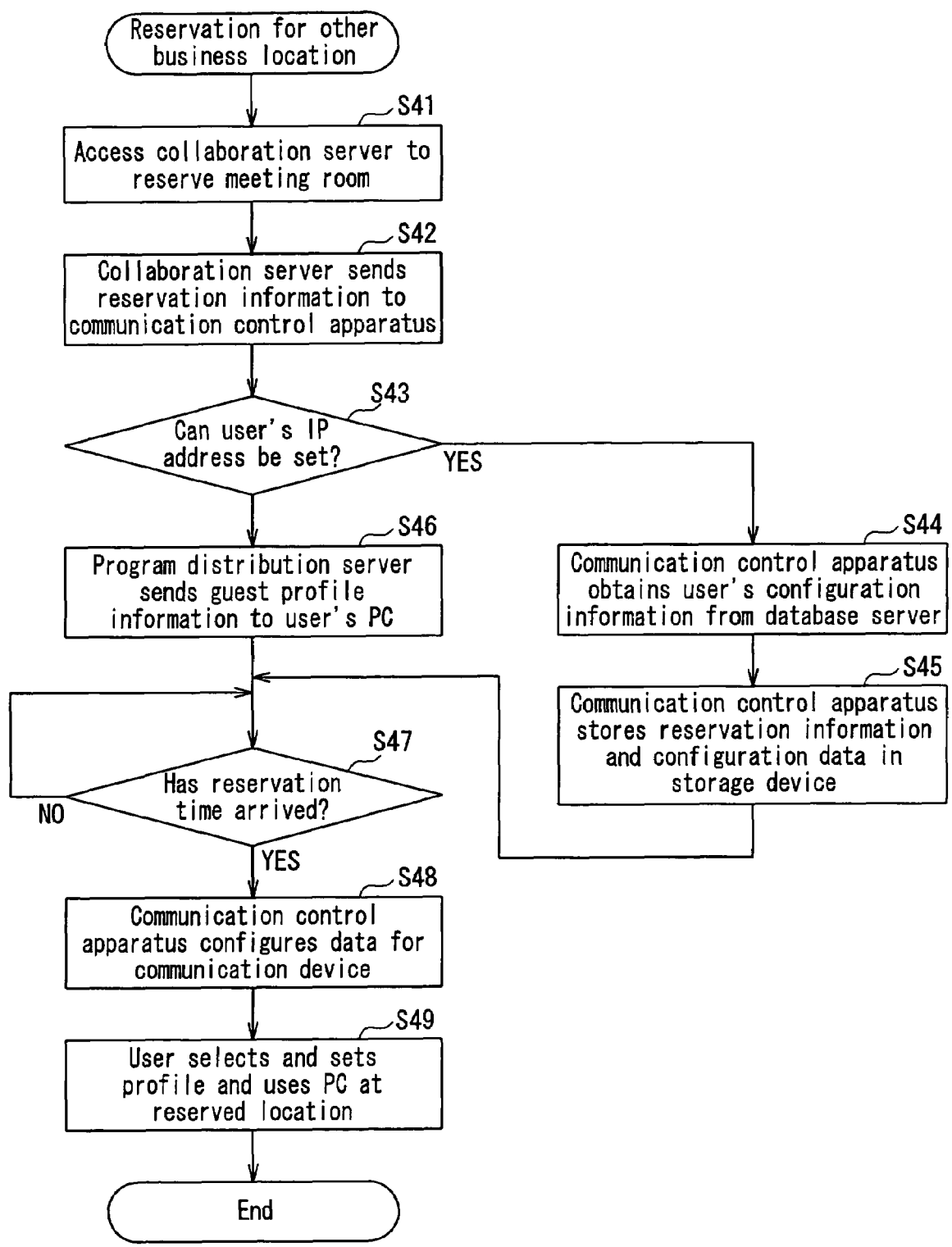
FIG. 12 is a flowchart showing the procedure performed when reserving the use of a wireless LAN personal computer in a meeting room and when actually using a wireless LAN personal computer in a meeting room, in a network system according to the second embodiment of the present invention.

Here, the procedure of the process performed by a user on the LAN 100 when reserving a meeting room on the LAN 200 in the system of this embodiment is described with reference to FIG. 12. First, the user accesses the collaboration server 1 from a PC on the LAN 100 to reserve a meeting room (step S41 in FIG. 12). At this time, the user enters the reservation period of the meeting room, the name of the meeting room, the user name and the name code. The entered information is sent to the meeting room reservation portion 12. Alternatively, the user name and the name code may be obtained automatically from log-in information to the collaboration server 1.

Next, of the reservation information obtained in step S41, the meeting room reservation portion 12 of the collaboration server 1 sends the reservation period of the meeting room, the name of the meeting room, the user name and the name code to the communication control apparatus 3 (step S42). The communication control apparatus 3 stores, in the storage device 31, these data sent from the collaboration server 1.

Then, the communication control apparatus 3 accesses the database server 2 to determine whether the IP address of the user's PC is usable in the meeting room reserved by the user, based on the name code sent from the collaboration server 1 in step S42 (step S43).

If the determination result of step S43 is YES, the communication control apparatus 3 obtains data necessary for configuring the IP address of the user's PC, the wireless AP and the like from the database server 2 (step S44), and stores the data in association with the data obtained in step S42 in the storage device 31 (step S45).

On the other hand, if the determination result of step S43 is NO, the communication control apparatus 3 stores, in the storage device 31, a pre-defined guest IP address as an IP address usable in the meeting room reserved by the user. Furthermore, the communication control apparatus 3 lets the program distribution server 5 distribute profile information including this IP address and the configuration information of the wireless LAN in the meeting room to the user's PC (step S46). The distributed profile is stored in the user's PC. The reservation of the meeting room is completed by the above-described process.

Thereafter, when the scheduled start time of use of the meeting room arrives (YES in step S47), the communication control apparatus 3 performs the necessary configuration of the router and the wireless AP in the meeting room reserved by the user based on the data in the storage device 31 (step S48). Next, of the profiles registered in the PC, the user selects the profile distributed in step S46 and sets the profile for the PC, making it possible for the user to use his or her own PC in the meeting room (step S49). Here, it is preferable that the selection of the profile can be effected by one-touch operation with GUI, since this simplifies the user's operation.

It also is preferable that the communication control apparatus 3 disables the configuration of the router, the wireless AP and the like after the scheduled end time of use of the meeting room to prevent unauthorized access, as is described in the first embodiment.

Figure 13:
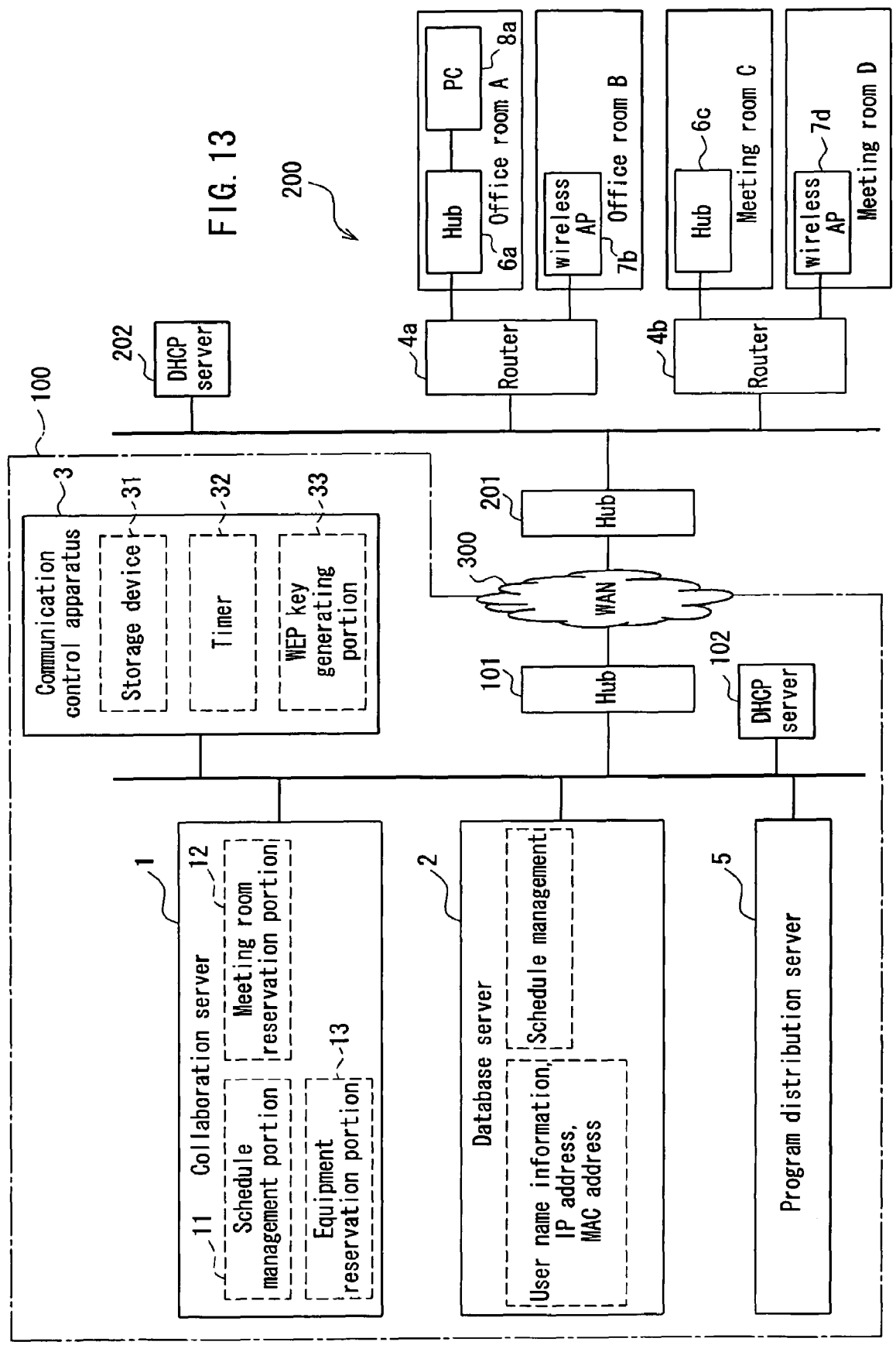
FIG. 13 is a block diagram showing the schematic configuration of a network system according to the second embodiment of the present invention.

It also is conceivable to use a method of distributing an address automatically using a DHCP server as shown in FIG. 13, in addition to the above-described method. In this case, when a user reserves a meeting room on the LAN 200, the MAC address of the user is read from the database server 2 and then registered in a DHCP server 202 on the LAN 200. As is described above, the configuration information of the wireless LAN is distributed, as a profile, from the program distribution server 5 to the user's PC.

Thereafter, when the scheduled start time of use of the meeting room arrives, the DHCP server 202 distributes the IP address only to the user's PC whose MAC address is registered in the DHCP server 202. Accordingly, the IP address on the LAN 200 is set for the PC that has been brought into the meeting room by the user. In this case, it is necessary to configure the user's PC so as to obtain an IP address automatically.

Then, the user can use the PC in the meeting room by selecting the profile that has been distributed from the program distribution server 5, and setting this profile. According to this method, the WEP key and the IP address of the wireless LAN are not distributed to a user who has not reserved a meeting room, so that it is possible to prevent unauthorized access. Although a configuration in which the DHCP servers 102, 202 are provided on the LANs of the business locations is shown as an example in FIG. 13, these DHCP servers may be provided together on the center side (on the LAN in which the collaboration server and the like are provided).

Although this embodiment has been described for the reservation of a meeting room and the like using a wireless LAN, the reservation of a meeting room and the like using a wired LAN can be performed similarly.

The present invention is useful as a communication control system or a network system that enables a personal computer usually connected to a LAN when in use to be connected temporarily to the same LAN from a different location and via a different communication device, while ensuring security without time and effort spent on configuration.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication control apparatus connected to a local area network, the communication control apparatus comprising:

a storage portion that stores a scheduled time at which a client device connected for use at a location in the local area network is connected for use at another location in the local area network, information of a communication device for the another location, wherein the communication device relays data between a server device connected to the local area network and the client device connected for use at the another location, and configuration information of the communication device for enabling communication with the client device; and a timer that indicates a time, wherein the communication control apparatus compares the scheduled time and the time indicated by the timer, and before the scheduled time, configures the communication device to enable communication with the client device based on the information of the communication device and the configuration information stored in the storage portion.

2. The communication control apparatus according to claim 1, wherein the another location in the local area network is another router in the local area network, and the configuration information includes an IP address and a MAC address of the client device.

3. The communication control apparatus according to claim 2, wherein the local area network further includes a wireless LAN access point as the communication device, wherein the another location in the local area network is another wireless LAN access point in the local area network, the communication control apparatus further comprises a WEP key generating portion that generates a WEP key that is distributed to each client device, and the configuration information further includes at least one of an SSID and a WEP key of the client device.

4. A network management system for enabling a client device connected for use at a location in a local area network to be connected for use at another location in the local area network, the system comprising:

a communication control apparatus comprises a storage portion and a timer that indicates a time, wherein the communication control apparatus configures a communication device that relays data between a server device connected to the local area network and the client device;

a schedule management portion for entering and storing a scheduled time at which the client device is connected for use at the another location in the local area network, and information relating to the another location; and a configuration information storage portion that stores configuration information of the communication device at the another location for enabling communication with the client device, wherein the communication control apparatus references the schedule management portion and stores, in the storage portion, the scheduled time stored in the schedule management portion and information of the communication device for the another location, references the configuration information storage portion and stores, in the storage portion, the configuration information of the communication device for enabling communication with the client device, compares the scheduled time and the time indicated by the timer, and before the scheduled time, configures the communication device to enable communication with the client device based on the information of the communication device and the configuration information stored in the storage portion.

5. The network management system according to claim 4, wherein the another location in the local area network is another router in the local area network, and the configuration information includes an IP address and a MAC address of the client device.

6. The network management system according to claim 5, wherein the local area network further includes a wireless LAN access point as the communication device, the another location in the local area network is another wireless LAN access point in the local area network, the communication control apparatus further comprises a WEP key generating portion that generates a WEP key that is distributed to each client device, and the configuration information further includes at least one of an SSID and a WEP key of the client device.

* * * * *